Patented June 25, 1940

2,205,558

UNITED STATES PATENT OFFICE 2,205,558

PRODUCT POSSESSING STERILIZING PROPERTIES AND METHOD OF APPLICATION

Lawrence H. Flett, Hamburg, N. Y., assignor to National Aniline & Chemical Company, Inc., New York, N. Y., a corporation of New York No Drawing. Application August 4, 1939, Serial No. 288,368

17 Claims. (Cl. 167—33)

This invention relates to sterilizers, i. e., compounds which inhibit the growth of micro-organisms, such as bacteria and spores.

In accordance with the present invention it has been found that notable ability to inhibit the growth of micro-organisms is possessed by that class of compounds characterized by containing the 2,5-dioxo-$\Delta^3$-pyrroline nucleus, which may be represented by the formula:

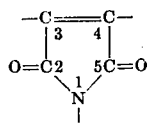

The 2,5-dioxo-$\Delta^3$-pyrrolines may be employed as bactericides, bacteriostatics, fungicides, and antimycotics, all of which are herein designated generically "sterilizers," and may be used for therapeutic, preservative, or antiseptic purposes. They may be applied alone or in solution, as liquids or fumigants. Compounds of the above class have been found to be highly efficient fungicides and antimycotics for vegetable parasites such as mildew, Epidermophyta, yeasts, etc., and effective bacteriostatics, bactericides and germicides for Staphylococcus aureus, Pityriasis capitis, etc.

The simplest compound of the above class is that in which all of the free bonds of the formula are joined to hydrogen. The resulting compound is maleimide which may be represented by the following formula:

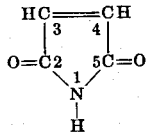

The hydrogen of the imide group may be replaced to obtain variously unsubstituted or substituted alkyl, phenyl, hexahydrophenyl and benzyl imides, which (especially those containing not more than about 12 carbon atoms) possess sterilizing properties similar to those of the parent compound. In fact, the antimycotic properties of the lower N-alkyl maleimides increase with the length of the alkyl carbon chain. Thus, the methyl imide is better than maleimide; the ethyl imide is better than the methyl imide; and the butyl imide is better than the ethyl imide. Above the amyl imides the decreasing solubility in water of the compounds overcomes their possibly greater toxicity so that the optimum activity of the unsubstituted alkyl maleimides is obtained with the butyl and amyl imides. Derivatives also may be obtained by substitution of the hydrogen of the maleyl radical. Thus, by substitution of one of these hydrogens by methyl, the citraconimides are formed which have been found to possess antimycotic properties closely approximating the properties of the corresponding maleimides. The antimycotics of the present invention thus embrace alkyl, aryl, aralkyl, cycloalkyl, and heterocyclic imides of maleic acid and their substitution products obtained by substituting any of the hydrogens with substituents, such as chlorine, bromine, iodine, fluorine, amino, hydroxy, nitro, sulfo, phospho, carboxy, carboxyamido, methyl, ethyl, propyl, butyl, amyl, phenyl, methoxy, ethoxy, propyloxy, butyloxy, amyloxy, and phenoxy, and derivatives of the latter types which also may contain one or more of the same general class of substituents, for example, hydroxy-alkoxy-alkyl such as hydroxy-ethoxy-ethyl.

The preferred compounds of the present invention are the alkyl maleimides of the general formula,

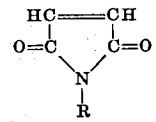

wherein R represents an alkyl group containing not more than six carbon atoms. These compounds are particularly satisfactory for use as sterilizers.

Of the aromatic imides, those maleanils which contain in the aromatic residue in ortho position to the imidic nitrogen a substituent radical of the group alkyl, alkoxy, halogen, hydroxy, and carboxy, are especially valuable in view of their chemical stability; and this stability may be enhanced by the presence of other substituents particularly in the remaining ortho position of the aromatic ring.

The compounds of the present invention may be employed in concentrations of the order of 0.1 gram per 100 ccs.; however, much lower concentrations have been found to have definite antimycotic properties. Much higher concentrations may be used in many instances, for example, when the products are used as fumigants for destroying mildew. However, because many of the compounds of the invention possess limited solubility and stability in water, concentrated solutions of them when required are prepared from organic solvents as, for example, acetone, hexane, dioxan, isopropyl ether, symmetrical diethoxyethylene. High concentrations of the imides are in general to be avoided in the treatment of epidermosis, as high concentrations have been found in some cases to be vesicatory and their excessive use may produce skin irritation. In some cases, moreover, application of high concentrations of these imides has been found to produce on test animals a depilatory effect; however, with continued application the hair again starts to grow on the denuded areas. When employed intermittently at the indicated concentrations of around 0.1 gram per 100 ccs. or less, the compounds have been relatively free from such objections.

Examples of compounds within the purview of the invention are the following: maleimide, N-methyl-maleimide, N-ethyl-maleimide, N-n-propyl-maleimide, N-n-butyl-maleimide, N-n-butyl-citraconimide, N-n-amyl-maleimide, N-n-hexyl-maleimide, N-n-octyl-maleimide, and the corresponding isobutyl, isoamyl, isohexyl, and isooctyl imides, N-benzyl-maleimide, N-(alpha-phenyl-ethyl)-maleimide, N-cyclohexyl-maleimide, 3-chlor-4-brom-1-methyl-maleimide, 3,4-dibrom-1-ethyl-maleimide, N-(chlor-methyl)-maleimide, maleanil (N-phenyl-maleimide), 2'-methyl-maleanil (N-ortho-tolyl-maleimide), 4'-methyl-maleanil (N-para-tolyl-maleimide), 2',5'-dimethyl-maleanil, 2',4'-dimethyl-maleanil, 2'-chlor-maleanil, 3'-chlor-maleanil, 2',5'-dichlor-maleanil, 4'-n-butyl-maleanil, 2'-methyl-3'-chlor-maleanil, 4'-tertiary-amyl-maleanil, 4'-hydroxy-maleanil, 4'-methoxy-maleanil, 4'-ethoxy-maleanil, citraconimide, N-ortho-tolyl-citraconimide, N-(4'-methoxy-3'-carboxy-phenyl)-citraconimide, pyrocinchonanil, N-3'-amino-pyrocinchonanil, N-quinolyl-maleimide, N-n-butyl-pyrocinchonimide.

The following examples further illustrate the invention:

EXAMPLE 1.—The bactericidal efficiency of N-normal-butyl-maleimide was determined according to the technique of the FDA method for determining phenol coefficients. The method is described in Circular #198, United States Department of Agriculture—Food and Drug Administration, December 1931. Sterile aqueous solutions of N-normal-butyl-maleimide which contained the imide in concentrations ranging from 1 part by weight in 800 volumes to 1 part by weight in 2000 volumes as shown in the table below, were inoculated with a 24-hour culture of *Staphylococcus aureus* and kept at 20° C. At intervals of five minutes, ten minutes, and fifteen minutes, after inoculation, subcultures in sterile nutrient broth were made and incubated at 37° C. for forty-eight hours. The growth of a subculture is indicated by a plus sign; no growth of a subculture is indicated by a zero. The bactericidal efficiency is expressed in terms of the highest dilution of the bactericide and of time of exposure of bacteria thereto required to kill the bacteria. The following results were obtained:

| | Dilution of bactericide | Culture after exposure of— | | |
|---|---|---|---|---|
| | | 5 min. | 10 min. | 15 min. |
| N-n-butyl-maleimide | 1 part in 800 | + | + | 0 |
| Do | 1 part in 1,000 | + | + | 0 |
| Do | 1 part in 1,200 | + | + | + |

These results indicate that N-normal butyl-maleimide in concentrations of 1 gram in 1000 ccs. water kills bacteria in 15 minutes but not in 10 minutes.

To demonstrate the mildew-inhibiting properties of N-n-butyl-maleimide the following experiments were made:

EXAMPLE 2.—An aqueous mixture containing by weight 4% potato starch, 4% gelatin and 92% distilled water was heated and agitated on a water bath until it was homogeneous. The paste was acidified to +25 on Fuller's scale (i. e., it was made neutral to phenolphthalein and then acidified with an amount of normal hydrochloric acid that is equivalent to an addition of 25 ccs. of normal hydrochloric acid to a liter of paste). The paste was cooled to about 25° C.

To four of five beakers each containing 25 ccs. of the prepared paste N-n-butyl-maleimide was added in amounts which resulted in mild concentrations of 0.001, 0.003, 0.005, and 0.01 gram of imide per 100 ccs. of the contents of the respective beakers. The contents of the five beakers were then inoculated with mildew spores, the beakers were covered with glass dishes or beakers, and incubated at 25° C. to 30° C. The rate of growth of mildew was noted and recorded as follows:

| Sample No. | Concentration in terms of grams of N-n-butyl-maleimide per 100 ccs. of medium | Days between inoculation and appearance of mildew growth |
|---|---|---|
| 1 (control) | None | 2 days. |
| 2 | 0.001 | 3 days. |
| 3 | 0.003 | No growth for the duration of the test—78 days. |
| 4 | 0.005 | |
| 5 | 0.01 | |

The results indicate that N-n-butyl-maleimide in very low concentrations is an effective inhibitor of mildew.

In this example N-n-butyl-citraconimide may be substituted for N-n-butyl-maleimide with substantially the same results.

EXAMPLE 3.—A medium for growing mildew, prepared as described in Example 2, was inoculated with mildew spores and for fifty days was continuously exposed in a confined space at a temperature between 25° C. and 30° C. to the fumes of N-n-butyl-maleimide. No growth of mildew was detected during such exposure.

As a confirming test, a sample of a medium which had been inoculated previously with mildew spores so that an area of about ½ inch diameter was covered with mildew growth, was placed in the same confined space and exposed to the vapors of N-n-butyl-maleimide for the same period of time. No visible extension of the mildew growth occurred on this sample, while the infected area of a duplicate sample of the medium outside the influence of the N-n-butyl-maleimide continued to spread until the entire surface of the medium was covered with the mildew growth.

EXAMPLE 4.—A number of small bars of steel 2½ inches long, ½ inch wide and 1/16 inch thick, were dipped in a 24 hour culture of *Staphylococcus aureus* and dried at 37° C. for 24 hours. Each of these bars was then suspended in a stoppered test tube to hang about one-half inch above the bottom of the tube where 0.05 gram of N-n-butyl-maleimide had been placed. The tubes were held at about 30° C. and at time intervals one of the bars was removed from its tube and placed in a tube of sterile broth which was then incubated at 37° C. for 48 hours. It was found that the pieces of steel which had been exposed to fumigation in their tubes for 43 hours or longer were sterile and did not give rise to any growth of bacteria in the broth subcultures.

EXAMPLE 5.—A piece of blotting paper 6 inches long and 1 and 1/16 inches wide was ruled in 1/16 inch squares. At the center of each square, the paper was seeded with mildew spores (Aspergillus species). A square at one end was cut off and used as a control; the remainder of the strip of paper was suspended in a stoppered bottle which contained 2 ccs. of N-n-butyl-maleimide. The bottle with contents was placed in a constant temperature oven maintained at 50° C. At intervals of 30 minutes, one square was cut from the strip with sterile scissors and dropped onto a sterile, potato dextrose agar medium which was then incubated for 4 days at 25° to 30° C. During this incubation period, none of the fumigated squares induced any detectable growth of mildew in the culture medium, while the control square induced a strong growth of mildew in two days.

EXAMPLE 6.—A potato-dextrose agar culture medium was prepared as follows: 200 grams of potatoes, cut to 1/2 inch cubes, were placed in 700 cc. of water and thoroughly agitated on a steam bath for about one hour. The resulting slurry was filtered through four thicknesses of cheese cloth. To 500 ccs. of the filtered solution 20 grams of dextrose were added, and the aqueous mass was added to a mixture of 17 grams of agar and 500 ccs. of water at about 90° C. The resulting warm mixture was agitated until it was homogeneous and was then poured in 25 cc. portions into two ounce bottles and sterilized by heating the bottles and contents in an autoclave for twenty minutes under 10 pounds pressure (110° C.). To the 25 cc. portions of this culture medium, N-ortho-tolyl-maleimide was added in amounts to give final concentrations of .001 to 0.10 gram per 100 cc. The samples were then inoculated with mildew spores and incubated at a temperature between 25° and 30° C. The periods of time which elapsed before mildew appeared in the portions were recorded as follows:

| Test No. | Conc. in grams of N-orthotolyl-maleimide per 100 cc. of sample | Days between inoculation and appearance of growth in sample |
|---|---|---|
| 1 | .001 | 5 days. |
| 2 | .002 | 5 days. |
| 3 | .003 | 14 days. |
| 4 | .004 | 14 days. |
| 5 | .005 | 14 days. |
| 6 | .007 | |
| 7 | .010 | |
| 8 | .020 | No growth for the duration of the test—177 days. |
| 9 | .050 | |
| 10 | .100 | |
| 11 | 0 | 2 days. |

EXAMPLE 7.—To determine the minimal concentrations at which N-n-butyl-maleimide exhibits its bactericidal and bacteriostatic properties N-n-butyl-maleimide was tested by the Kolmer Bacteriostatic method described at page 425 of "Approved Laboratory Technic" by John A. Kolmer and Fred Boerner, published 1931 by D. Appleton Century Company, New York. The test is designed to show both bactericidal and bacteriostatic effects. A dilution with negative results on both culture and subculture is said to be bactericidal; a dilution which gives a negative result with a culture, and a positive result with a subculture is said to be bacteriostatic. In this test, the method used for preparing standard nutrient broth (culture medium) was that described in Circular #198, United States Department of Agriculture, relating to "United States Food and Drug Administration Methods of Testing Antiseptics and Disinfectants."

1 cc. of an aqueous solution of known dilution of N-n-butyl-maleimide and 9 ccs. of a mixture of 99 ccs. sterile culture medium and 1 cc. of a 24-hour culture of *Staphylococcus aureus*, were placed in a sterile test tube. In a series of test tubes thus prepared, the contents of each tube represented one of a series of dilutions at the usual spacings ranging from 1 part N-n-butyl-maleimide in 10,000 parts to 1 part of the said imide in 50,000 parts. The tubes were incubated at 37° C. for 5 days and examined for growth and non-growth of the organism. Each tube which showed no growth of organism was then subcultured by transferring one 4 mm. loopful of the test-tube contents to a fresh tube of sterile culture medium. The tubes containing the subcultures were incubated for 48 hours at 37° C. and examined for growth and non-growth of organism. It was found that no separation of bacteriostatic and bactericidal effects could be noted. The results were therefore reported only as dilutions giving bactericidal results; they were as follows:

| Dilution of bactericide | Result of— | |
|---|---|---|
| | Culture | Subculture |
| 1 in 10,000 | 0 | 0 |
| 1 in 15,000 | + | + |

The same results were obtained when N-benzyl-maleimide was used instead of N-n-butyl-maleimide in this example.

EXAMPLE 8.—Six solutions each containing 15 grams of molasses, 15 grams of cerelose, and 300 cc. of distilled water, were adjusted to a temperature between 25° and 30° C. To each of five such portions N-ortho-tolyl-maleimide was added in an amount sufficient to yield concentrations of 0.005, 0.01, 0.02, 0.05 and 0.10 gram of imide per 100 ccs. of solution, respectively. The portion to which no tolyl-maleimide was added was placed in sterilized flask No. 1 and the other five portions were placed in flasks Nos. 2, 3, 4, 5, and 6, respectively. All portions were inoculated with about 1/8 of a cake of Fleischmann's yeast. The flasks were then closed with tight stoppers provided with outlet tubes, the outer ends of which were immersed in water. All the flasks were maintained in an incubating apparatus at a temperature maintained between 25° and 30° C. The evolution of gas at the points of immersion of the outlet tubes was taken as an indication of fermentation. The following results were obtained.

| Flask No. | Concentration expressed as grams of inhibitor per 100 ccs. of sample | Time elapsed between inoculation and first sign of fermentation |
|---|---|---|
| 1 | 0.000 | 0.5 hours. |
| 2 | 0.005 | 2 days. |
| 3 | 0.010 | 6 days. |
| 4 | 0.020 | 8 days. |
| 5 | 0.050 | No growth for the duration of the test, i. e., 16 days. |
| 6 | 0.100 | No growth for the duration of the test, i. e., 16 days. |

EXAMPLE 9.—To each of four samples of a culture medium prepared as described in Example 2, citraconanil was added in amounts yielding solutions having concentrations of 0.01, 0.02, 0.05 and 0.10 gram of imide per 100 cc. of medium, respectively. A control sample containing no inhibitor and the four samples containing the citraconanil were then inoculated with mildew spores and incubated at a temperature between 25° and 30° C. The results obtained were as follows:

| Sample No. | Concentration in terms of grams of citraconanil per 100 cc. of medium | Days between inoculation and appearance of mildew growth |
| --- | --- | --- |
| 1 | 0.00 | 2. |
| 2 | 0.01 | 3. |
| 3 | 0.02 | No growth for duration of test (20 days). |
| 4 | 0.05 | Do. |
| 5 | 0.10 | Do. |

EXAMPLE 10.—A solution containing 0.003 gram of N-cyclohexyl-maleimide per 100 ccs. of potato-dextrose agar medium (made as described in Example 6) was seeded with spores of a mold—(Aspargillus species). A control solution showed mildew growth in 3 days; the solution containing N-cyclohexyl-maleimide showed no mildew growth for the duration of the experiment which was 177 days.

EXAMPLE 11.—The following tests were conducted to determine the relative effectiveness of a number of the maleimides as mildew inhibitors: To 25 cc. portions of a potato-dextrose agar medium prepared as described in Example 6, sufficient amounts of the particular maleimide undergoing test were added to obtain concentrations of the imide ranging from about 0.001 to about 0.01 gram of imide per 100 cc. of medium. In each case the imide was added in the form of one-tenth cc. of an alcoholic solution. Thus, for the preparation of a 0.001% concentration of the imide in the agar medium 0.625 gram of the imide was weighed out and dissolved in 250 ccs. of alcohol and 0.1 cc. of the resultant solution was added to the 25 ccs. of agar medium. The media was then seeded with mildew spores (Aspergillus species) and incubated for five months at average household temperatures.

The following concentrations are the approximate minima indicated for preventing growth of mildew throughout the five-month period:

| Identity of the imide | Grams of imide per 100 ccs. of medium |
| --- | --- |
| N-amyl-maleimide | 0.001 |
| N-methyl-maleimide | 0.002 |
| N-ethyl-maleimide | 0.002 |
| N-n-butyl-maleimide | 0.002 |
| N-cyclohexyl-maleimide | 0.002 |
| N-benzyl-maleimide | 0.003 |
| N-(alpha-phenyl ethyl) maleimide | 0.004 |
| N-ethoxy-ethyl-maleimide | 0.004 |
| 2'-methyl-maleanil | 0.007 |
| N-methyl-dichlor-maleimide | 0.01 |
| N-methyl-mono-chlor-maleimide | *0.02 |

*Tested at strengths of 0.01 to 0.1 gram per 100 ccs. of medium.

A control sample showed mildew growth at the end of two days.

The following table gives the concentrations at which a number of other maleimides prevented mildew growth in a potato-starch-gelatin medium for the duration of the test which in every case was between 50 and 60 days:

| Identity of the imide | Grams of imide per 100 ccs. of medium |
| --- | --- |
| 2',4'-dimethyl-maleanil | 0.005 |
| 2',5'-dimethyl-maleanil | 0.005 |
| 2',6'-dimethyl-maleanil | 0.005 |
| 3'-chlor-maleanil | 0.005 |
| 2'-methyl-3'-chlor-maleanil | 0.005 |
| N-hexyl-maleimide | 0.005 |
| Maleanil | 0.01 |

The following table gives the concentrations at which a number of other maleimides prevented mildew growth in a potato-starch medium for the duration of the test which in every case lasted for 16 days. Concentrations tested were 0.01, 0.05, 0.10, 0.20, and 0.50 gram per 100 ccs. of medium:

| Identity of the imide | Grams of imide per 100 ccs. of medium |
| --- | --- |
| Maleimide | 0.05 |
| Octyl-maleimid | 0.05 |
| 4'-n-butyl-maleanil | 0.05 |
| Citraconimide | 0.10 |
| 4'-tertiary-amyl-maleanil | 0.5 |

The antimycotic effect of maleimides upon mycotic areas on human beings is illustrated by the following example:

EXAMPLE 12.—A typical case of epidermophytosis which was diagnosed by a qualified physician as "athlete's foot" was treated once daily for four successive days with an acetone solution of N-benzyl-maleimide containing 1 gram of this imide per 1000 ccs. of acetone. Relief from itching, and decrease of erythema followed within a few hours of the first application; healing was well under way when the fourth application was made. Substantially the same result was obtained repeatedly in similar treatments of a large number of typical cases of "athlete's foot."

The antimycotic effect of maleimides upon mycotic areas on animals is illustrated by the following example:

EXAMPLE 13.—Rapid cures or unmistakable improvement in the conditions of animals such as cats, dogs, horses, cattle and sheep suffering from mycotic infections were obtained readily by swabbing or spraying the infected parts with acetone solutions of N-n-butyl-maleimide which contained from 1 gram to 2.5 grams of the imide per 1000 ccs. solution. Thus, in a case of moist eczema of a dog, the animal was washed with soap and water to remove accumulated serum from the infected part, which was then dried, and swabbed once daily for four successive days with an acetone solution of N-n-butyl-maleimide containing 1 gram of the imide per 1000 ccs. of solution. The raw appearance of the infected area changed after the second application to that of a clean-looking, healing patch; and within about ten days the area was completely healed.

Since the sterilizers of the present invention are for the most part new chemical compounds, the following additional examples are given to illustrate the preparation of these new type compounds. Parts are by weight.

EXAMPLE 14.—*Preparation of N-normal-butyl-maleimide*

A solution of 98 parts maleic acid anhydride in 200 parts toluene was mixed with a solution of 73 parts normal butyl-amine in 100 parts toluene. The mixture was cooled to about 25° C. and the deposited crystals of N-n-butyl-maleamic acid were separated as a filter cake. (Yield of this acid was about 92.5% of theory). The dry N-n-butyl-maleamic acid was distilled in vacuo; the distillate boiling up to 190° C. at 13 mm. was collected; and this distillate was refractionated. The fraction boiling between 82° C. at 4 mm. and 88° C. at 4 mm. was collected separately and consisted chiefly of N-n-butyl-maleimide. Yield was about 42.5% of theory. It consisted of a water-white liquid having a setting point between 14° and 16° C., and strong lacrimatory properties. It is soluble in alcohol, ether, and acetone and slightly soluble in water.

The reactions involved in the preparation of the product may be represented as follows:

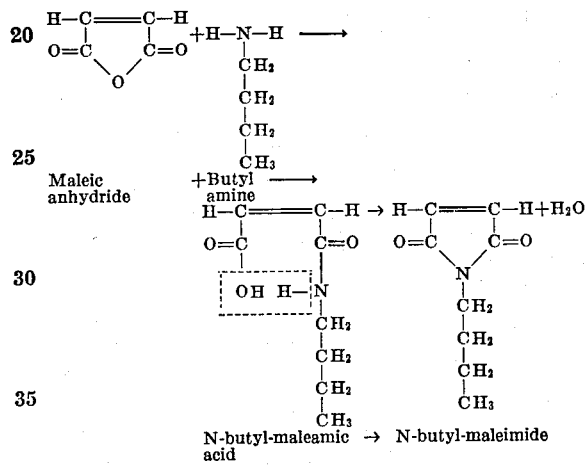

Example 15.—*Preparation of mixed amyl-maleimides*

A solution of 27 parts of a commercial mixture of mono-amylamines in 50 parts toluene was mixed quickly with a solution of 30 parts maleic acid anhydride in 50 parts toluene. After an interval of about one-half hour, the mixture was distilled in vacuo; the portion boiling below 80° C. at 15 mm. was chiefly toluene; the distillate boiling between 80° C. at 15 mm. and 135° C. at 12 mm. was collected separately. After separation of the water formed during the reaction the latter fraction was redistilled in vacuo for purification and the fraction boiling between 90° C. at 15 mm. and 105° C. at 15 mm. pressure was collected separately as the desired mixture of N-amyl-maleimides. The mixture was a water-white liquid somewhat irritating to the eyes; soluble in alcohol, ether, and acetone; and slightly soluble in water.

The reactions may be represented as follows:

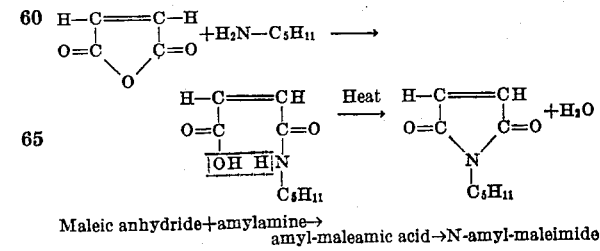

Maleic anhydride+amylamine→ amyl-maleamic acid→N-amyl-maleimide

Example 16.—*Preparation of N-normal-butyl-citraconimide*

A solution of 22 parts normal butylamine in 50 parts toluene was mixed with a solution of 34 parts citraconic anhydride in 150 parts toluene. The mixture was agitated vigorously and cooled to about 25° C. The slurry was filtered to separate the crystals of mono-N-n-butyl-citraconamic acid as a filter cake. The cake was charged to a vacuum still and the distillate boiling up to 160° C. at 5 mm. was collected, and then redistilled. The fraction boiling between 125° C. and 135° C. at 5 mm. was collected separately as the desired N-n-butyl-citraconimide. (Yield of mono-N-n-butyl-citraconamic acid was about theoretical. Yield of N-n-butyl-citraconimide was 76.7% of theoretical.) The N-n-butyl-citraconimide thus obtained is a pale straw-colored liquid with an odor resembling sage. The solubilities resemble those of N-amyl-maleimide.

The reaction may be represented as follows:

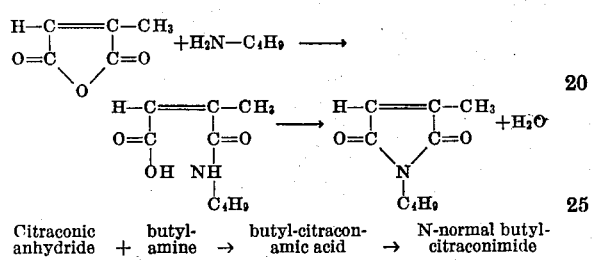

Citraconic anhydride + butyl-amine → butyl-citraconamic acid → N-normal butyl-citraconimide

Example 17.—*Preparation of N-ortho-tolyl-maleimide (2'-methyl-1-maleanil)*

107 parts of ortho-toluidine were dissolved in 250 parts toluene, and the solution was added rapidly to a vigorously agitated solution of 98 parts maleic anhydride in 250 parts toluene. Combination was rapid, as evidenced by a considerable rise in temperature of the mixture, which was then cooled to about 25° C. and filtered. The filter cake of crystalline material was chiefly 2'-methyl-maleanilic acid which may be represented by the formula:

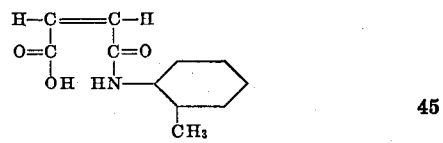

It was dried in vacuo (about 15 mm. mercury) and between 90° C. and 100° C. Yield of dry product was about 201 parts.

The dry 2'-methyl-maleanilic acid was then distilled in vacuo. The distillate boiling between 160° C. at 12 mm. and 210° C. at 12 mm. was collected separately. It was recrystallized from 70 parts of warm alcohol by cooling its solution to about 25° C. The crystals were separated as a cake by filtration, washed with about 20 parts of cold alcohol, and dried in vacuo at room temperature. Yield of dry product equalled 103 parts. The crystals were fine faint-yellow needles, and had a melting point of 67° to 71° C. By further recrystallization, a product which had a melting point between 75° C. and 76° C. was obtained.

The reaction effected by the distillation and the final product may be represented as follows:

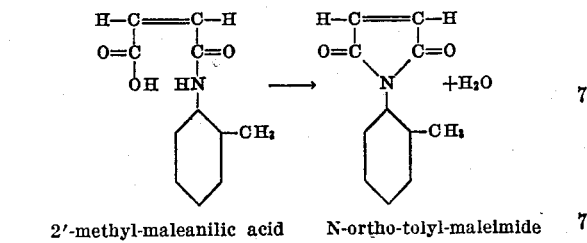

2'-methyl-maleanilic acid    N-ortho-tolyl-maleimide

EXAMPLE 18.—*Preparation of N-cyclohexyl-maleimide*

In an apparatus fitted with an agitator, a reflux condenser, and means for cooling the reacting mass, a solution of 99 grams cyclohexylamine in 300 ccs. toluene was added to an agitated solution of 98 grams maleic anhydride in 300 ccs. toluene at such a rate that the temperature of the mixture did not exceed 80° to 90° C. The amine and anhydride reacted with great rapidity to form the cyclohexyl maleamic acid. As soon as the reacting solutions were completely mixed, the mass was cooled to about 20° C. The cyclohexyl maleamic acid separated as small crystals which were removed as a cake by filtering the resulting slurry. The cake was sucked dry and air-dried to a white crystalline product.

The dry cyclohexyl maleamic acid was distilled in vacuo at 90° C. at 10 mm. to 170° C. at 10 mm., and the distillate was recrystallized from a small amount of denatured alcohol. The white recrystallized product was cyclohexyl-maleimide, melting point 88° to 90° C.

EXAMPLE 19.—*Preparation of N-n-butyl-pyrocinchonimide*

13 grams of pyrocinchonic anhydride were mixed with 10 grams of n-butylamine in 15 grams ortho-dichlorbenzene. The mixture was thoroughly agitated and heated to boiling under a reflux condenser for about one hour, then distilled at 22 mm. mercury absolute pressure. The distillate was refractionated, the fraction boiling between 130° at 22 mm. and 139° C. at 22 mm. being collected as the one which was chiefly butyl-pyrocinchonimide. The fraction weighed 15 grams. Butyl-pyrocinchonimide may be represented by the following formula:

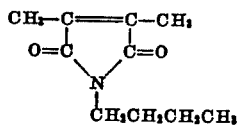

I claim:

1. A sterilizer comprising a 2,5-dioxo-$\Delta^3$-pyrroline.
2. A sterilizer comprising a 2,5-dioxo-$\Delta^3$-pyrroline containing not more than 12 carbon atoms.
3. As a sterilizer an N-phenyl-2,5-dioxo-$\Delta^3$-pyrroline.
4. As a sterilizer an N-alkyl-2,5-dioxo-$\Delta^3$-pyrroline containing not more than 6 carbon atoms in the alkyl group.
5. As a sterilizer an N-phenyl-maleimide containing a substituent of the group consisting of alkyl, alkoxy, hydroxy, carboxy, and halogen, in ortho position to the imide nitrogen.
6. A sterilizer comprising an N-butyl-maleimide.
7. A sterilizer comprising as an essential active ingredient thereof N-normal-butyl-maleimide.
8. A sterilizer comprising as an essential active ingredient thereof N-ortho-tolyl-maleimide.
9. A sterilizer comprising as an essential active ingredient thereof N-benzyl-maleimide.
10. The method of inhibiting the growth of fungi or bacteria, which comprises applying thereto a 2,5-dioxo-$\Delta^3$-pyrroline.
11. The method of inhibiting the growth of fungi or bacteria, which comprises applying thereto a 2,5-dioxo-$\Delta^3$-pyrroline containing not more than 12 carbon atoms.
12. The method of inhibiting the growth of fungi or bacteria, which comprises applying thereto an N-phenyl-2,5-dioxo-$\Delta^3$-pyrroline.
13. The method of inhibiting the growth of fungi or bacteria, which comprises applying thereto an N-alkyl-2,5-dioxo-$\Delta^3$-pyrroline containing not more than 6 carbon atoms in the alkyl group.
14. The method of inhibiting the growth of fungi or bacteria, which comprises applying thereto an N-phenyl-maleimide containing a substituent of the group consisting of alkyl, alkoxy, hydroxy, carboxy, and halogen, in ortho position to the imide nitrogen.
15. The method of inhibiting the growth of fungi or bacteria, which comprises applying thereto N-normal-butyl-maleimide.
16. The method of inhibiting the growth of fungi or bacteria, which comprises applying thereto N-ortho-tolyl-maleimide.
17. The method of inhibiting the growth of fungi or bacteria, which comprises applying thereto N-benzyl-maleimide.

LAWRENCE H. FLETT.